United States Patent [19]

McLeod, Jr.

[11] 4,328,459

[45] May 4, 1982

[54] CURRENT INRUSH LIMITING APPARATUS

[75] Inventor: Fenwick R. McLeod, Jr., Prospect Heights, Ill.

[73] Assignee: TRW Inc., Cleveland, Ohio

[21] Appl. No.: 181,372

[22] Filed: Sep. 4, 1980

[51] Int. Cl.³ .............................................. G05F 5/00
[52] U.S. Cl. .................................. 323/300; 323/321; 363/49
[58] Field of Search ............... 323/300, 319, 320, 321, 323/901, 908; 361/92; 363/49

[56] References Cited

U.S. PATENT DOCUMENTS

| | | |
|---|---|---|
| 3,363,143 | 1/1968 | Cavanaugh . |
| 3,456,133 | 7/1969 | Warren ........................... 323/321 X |
| 3,500,174 | 3/1970 | Ellerbeck . |
| 3,506,907 | 4/1970 | Porterfield et al. ................. 363/49 |
| 3,562,621 | 2/1971 | Schaefer ......................... 363/49 X |
| 3,617,864 | 11/1971 | Senger . |
| 3,787,756 | 1/1974 | Berger . |
| 3,935,511 | 1/1976 | Boulanger et al. . |
| 3,935,527 | 1/1976 | Michelet et al. ................ 323/908 X |
| 3,996,506 | 12/1976 | Kichak . |
| 4,207,516 | 6/1980 | Babcock ......................... 323/908 X |

Primary Examiner—William M. Shoop
Attorney, Agent, or Firm—Yount & Tarolli

[57] ABSTRACT

Current inrush limiting apparatus is disclosed including a power supply circuit (32) which regulates the transmission of power from a source (12) to a load (14). A soft start control (36) controls the power supply to prevent excessive current inrush to the load by causing it to apply power to the load gradually when the power first comes on. A dropout timer (38) monitors the power signal and rapidly resets the soft start control circuit if a power dropout exceeds a predetermined minimum duration. This ensures that excessive current inrush also does not occur following brief power dropouts.

8 Claims, 3 Drawing Figures

CURRENT INRUSH LIMITING APPARATUS

BACKGROUND AND FIELD OF THE INVENTION

The present invention relates to circuits for supplying power to electrical devices and more particularly to a circuit for preventing a large inrush of current to the electrical device upon the initial application of power to the electrical device and following brief power dropouts.

Certain types of electrically operated equipment include large capacitive elements across which D.C. power is directly applied. D.C. power supplies, for example, often employ large filter capacitors for reducing ripple from rectified A.C. power signals. Upon the initial application of power to this type of equipment, there is a large inrush of current to initially charge the capacitive elements to their normal operating voltage. This large inrush current can damage rectifying diodes and other electrical devices in the current path, such as relays, fuses, etc. It is therefore desirable to include some means for controlling the initial application of power to the equipment so that this large inrush of current is avoided. Patents disclosing current inrush limiting power supplies of this nature include Berger, U.S. Pat. No. 3,787,756, Senger, U.S. Pat. No. 3,617,864, Ellerbeck, U.S. Pat. No. 3,500,174, Cavanaugh, U.S. Pat. No. 3,363,143, Boulanger, et al., U.S. Pat. No. 3,935,511 and Kichak, U.S. Pat. No. 3,996,506.

In a common embodiment, these inrush current limiting circuits control the supply of half or full-wave rectified A.C. power to the filter capacitor included in the power supply which represents the load of the inrush limiting circuit. The inrush limiting circuit includes one or more SCRs for controlling the application of this rectified A.C. signal to the load. Inrush current is limited by controlling the phase angle at which this SCR is triggered in each half cycle of the A.C. power signal. A "soft start" capacitor develops a control voltage across it which is used to establish the triggering point of the SCR in each half cycle of the A.C. signal. Upon the initial application of power to the circuit, the soft start capacitor is fully discharged; the SCR then triggers late in the cycle, permitting only a small portion of the A.C. power to reach the load. Thereafter, however, the soft start capacitor gradually charges, causing the SCR to be triggered at earlier and earlier times in each half cycle of the A.C. power signal. Power is thus gradually applied to the load.

Even with these soft start circuits, however, large inrush currents may still occur following brief power outages. During such power outages, the capacitive element of the load circuit may discharge much more rapidly than the soft start capacitor, hence when power returns the circuit does not "soft start" although the load capacitor is discharged substantially. In this case a harmful inrush current may result.

The aforemention patent to Berger, U.S. Pat. No. 3,787,756, includes a circuit for discharging the soft start capacitor rapidly whenever the power signal is at or near a zero voltage level. Consequently, in the event of a power outage the soft start capacitor will be discharged within several cycles of the A.C. line, and the circuit will soft start upon the return of power thereto. The rate at which the soft start capacitor is discharged in the Berger patent is limited, however, since the circuit will inherently also discharge the capacitor to some extent during the zero crossings of the A.C. power signal. If the rate at which the soft start capacitor is discharged is too great, this discharge between half cycles will cause the circuit to be continually "soft starting". It is therefore necessary to scale the rate at which the soft start capacitor is discharged such that substantial discharge of the soft start capacitor does not occur during the zero crossings. At this rate of discharge, a time interval corresponding to several cycles of the A.C. line may be required to discharge the soft start capacitor and thereby reset the soft start feature. If power returns before the soft start circuit is fully reset, excessive inrush current may result.

The patent to Senger, U.S. Pat. No. 3,617,864, includes a simple mechanical switch which bypasses the soft start capacitor and which may therefore be used to discharge the capacitor and thereby reset the soft start feature. In Senger, however, there is no mechanism for controlling this switch to operate upon the interruption of power. Moreover, since the switch is mechanical in nature, it is unlikely that it could be actuated rapidly enough to properly reset the soft start feature upon brief power outages lasting no more than perhaps several cycles of the A.C. line.

SUMMARY OF THE INVENTION

It would be desirable to provide some means for completely resetting the soft start feature upon even very brief power outages. It would further be desirable to accomplish this without incidentally partially resetting the soft start feature during zero crossings of the A.C. power signal. An advantage of apparatus meeting these goals is that, if used to supply A.C. power signals to A.C. loads, it eliminates the brief D.C. component which might exist in the power signal following a power dropout if the soft start were not reset.

The present invention achieves these and other objects and advantages by monitoring the A.C. power line, timing power dropouts, and rapidly resetting the soft start feature whenever the power dropout exceeds a certain predetermined length of time. By separating the resetting function from the power dropout sensing function, it is possible to provide a resetting means which resets the soft start circuit very rapidly upon triggering by the dropout timer. This reset timer is not actuated by zero crossings of the A.C. line since these brief zero crossings are not of sufficient duration to permit the dropout timer to time out.

In accordance with the present invention, apparatus is provided for transmitting power from a power source to a load. The apparatus includes first means for controlling the level of power transmitted to a load from a power source, which means includes for soft starting the transmission of power to the load upon initial turn-on of the power source by initially transmitting power at a low level and thereafter gradually increasing the level of transmitted power to a higher level. Second means are provided for resetting the soft start only if the power provided by the power source drops out for in excess of a predetermined interval of time. Thus, when power returns thereafter the transmission of power to the load is again soft started.

In the described embodiments, apparatus is provided for controlling the application of an A.C. power signal to a load so as to prevent excessive current inrush. The apparatus comprises A.C. phase control power supply means responsive to a control signal for varying the phase angle at which the A.C. power signal is applied to a load, with the power supply means responding to a control signal having a first value to apply power at a phase angle wherein the A.C. power is applied to the load at the first level and to a control signal having a second value to apply power at a phase angle wherein A.C. power is applied to the load at a second level which is greater than the first level. Means are included for providing the control signal to the power supply means with this control signal providing means providing a control signal having a first value upon the initial application of power to the apparatus and thereafter gradually varying the control signal value toward the second value, with the means being responsive to a reset signal for resetting the control signal to the first value within a fraction of a cycle of the A.C. power signal. Finally, the apparatus includes reset means which is responsive to the withdrawal of the A.C. power signal from the apparatus for providing the reset signal to the control signal providing means, but only if power has been interrupted for in excess of a predetermined period of time. Power withdrawals which are shorter than the predetermined period of time therefore do not reset the control signal providing means but power withdrawals which are in excess of the predetermined period of time cause the control signal providing means to reset the control signal within a fraction of a cycle of the A.C. power signal.

BRIEF DESCRIPTION OF THE DRAWINGS

The foregoing and other objects and advantages of the present invention will become more readily apparent from the following detailed description, as taken in conjunction with the accompanying drawings, wherein.

DETAILED DESCRIPTION

Figure 1:
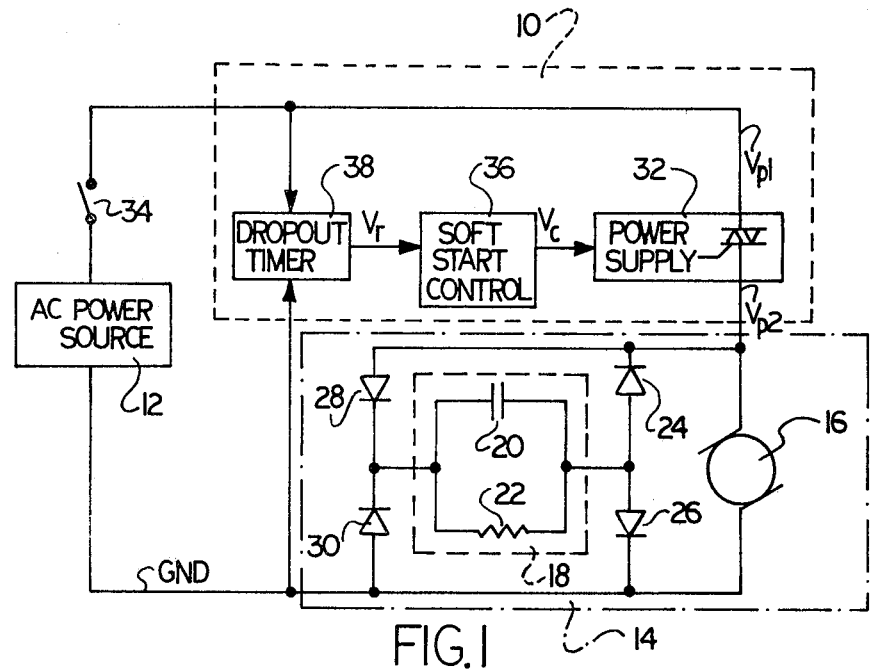
FIG. 1 is an overall block diagram of a power providing circuit in accordance with the teachings of the present invention.

There is illustrated in FIG. 1 a broad block diagram of an apparatus 10 for transmitting power from a power source, such as A.C. power source 12, to several load circuits 14. In FIG. 1 the load circuits 14 include an A.C. motor 16 and a D.C. powered load, generally indicated at 18. This D.C. load 18 is schematically represented as comprising a filter capacitor 20 and a load resistance 22. Of course, the load 18 will usually comprise a more complicated circuit, such as a conventional off-the-line, switched-mode power supply and control circuitry for a microwave oven. The D.C. signal required by the D.C. load circuit 18 is derived from the A.C. power signal applied across both of the load circuits 14 by a full-wave rectifier consisting of four diodes 24, 26, 28 and 30.

The A.C. power signal generated by the A.C. power source 12 is applied across the load circuits 14 under control of a circuit including power supply 32, soft start control 36, and dropout timer 38. To better understand the following description of the nature and operation of these elements of the apparatus of FIG. 1, reference should be made to the waveform diagram of FIG. 2.

The path between the A.C. power source 12 and the load circuits 14 includes the power supply 32 and a switch 34, connected in series therewith. Upon closure of the switch 34, the A.C. power signal $V_{p1}$ generated by the A.C. source 12 is applied across the series connected combination of the power supply circuit 32 and the load circuits 14. The power supply circuit 32 includes a semiconductor switch for selectively passing or blocking this A.C. power signal $V_{p1}$ from the load circuits 14. If the semiconductor switch incorporated in the power supply 32 were continually "closed" upon initial power-up, a large inrush of current would occur to charge the capacitor 20 associated with the D.C. load circuit 18. As stated previously, this large inrush of current could damage components of the circuits, including the switch 34, the semiconductor switch associated with power supply 32, and the diodes 24–30.

A soft start control circuit 36 is therefore provided to generate a control signal $V_c$ for causing the power suppy 32 to gradually apply the A.C. power signal $V_{p1}$ to the load circuits 14. The power supply 32 regulates the point at which the solid state switch included therein is triggered ("closed") in each half cycle of the A.C. power signal so as to thereby control the rate at which power is supplied to the load circuits 14. The solid state switch will automatically "open" at the conclusion of each half cycle.

The point at which the solid state switch associated with the supply 32 triggers in the A.C. cycle is directly controlled by the control signal $V_c$ provided by the soft start control circuit 36. When this control signal is very low, the switch associated with the power supply 32 will trigger very late in each half cycle of the A.C. power signal, hence very little of the A.C. power signal will be transmitted to the load circuits 14. As the control signal $V_c$ increases in magnitude, however, the triggering point of the solid state switch occurs earlier in each half cycle, permitting a greater portion of the A.C. power signal to be applied to the load circuits 14. After the switch 34 has been closed long enough for the circuit to reach steady state operating conditions, the control signal $V_c$ will have reached its maximum value and the switch 32 will be triggered essentially at the beginning of each half cycle, whereby substantially the entire A.C. power signal $V_{p1}$ is applied to the load circuit 14. This can be seen in FIG. 2, wherein the time $t_1$ represents the time at which the switch 34 is closed.

Figure 2:
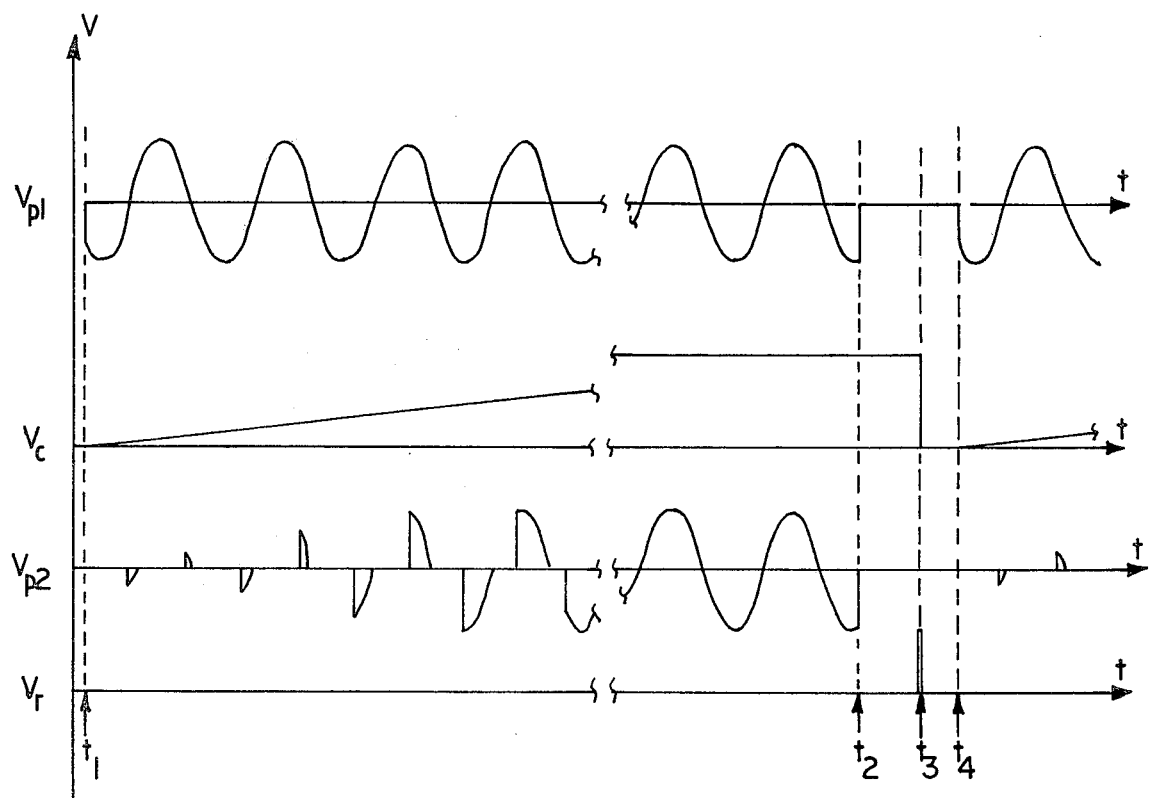
FIG. 2 is a diagramatic representation of the waveforms of various signals generated by the circuitry of FIG. 1; and, FIG. 3 is a more detailed circuit schematic of one embodiment of the apparatus illustrated broadly in FIG. 1.

In accordance with the present invention, the soft start control circuit 36 responds to a reset signal by rapidly resetting the control signal $V_c$ to zero. This reset signal $V_r$ is generated by a power dropout timer 38 which monitors the A.C. power signal applied across the series-connected combination of the power supply 32 and the load circuits 14. Whenever there is a power dropout (illustrated as occurring at time $t_2$ in FIG. 2), the dropout timer 38 begins timing. If the power dropout lasts long enough for the dropout timer 38 to time out (which is illustrated in FIG. 2 as occurring at time $t_3$) then the dropout timer will generate a sharp reset pulse on the reset line $V_r$. The soft start circuit 36 responds to this reset pulse to completely reset the control signal $V_c$ within a small fraction of one cycle of the A.C. power line. Since the control signal is thereafter reset, the circuitry 10 will soft start when power reappears (indicated as occurring at time $t_4$ in FIG. 2) as when power was initially applied to the circuit.

The circuitry illustrated in FIG. 1 has the advantage that the reset of the soft start circuit occurs quite rapidly, and only occurs during bona fide dropouts of the A.C. power signal, rather than also occurring incidentally at zero crossings of the A.C. power signal. The circuitry of FIG. 1 distinguishes between an actual power dropout and zero crossings by timing the length of the interval during which power is absent. If the power dropout exceeds a predetermined period of time (indicated in FIG. 2 as being the interval between times $t_2$ and $t_3$) then the timer provides a reset signals which completely resets the soft start control circuit 36. In the event that the power outage is shorter than this predetermined period of time, however, (i.e., during zero crossings of the A.C. power signal or extremely brief power outages) the timer will not time out and the soft start control signal will not be reset.

The FIG. 1 circuit essentially eliminates the D.C. component which would momentarily exist in the power signal if the power were not gradually re-applied following a power dropout. The source of this D.C. component can be readily understood from a consideration of the waveform $V_{p1}$ of FIG. 2. Here it can be seen that at time $t_4$, when power abruptly returns, the power signal is asymmetrical; the leading lobe of the A.C. signal (in this case, the negative lobe) was not preceded by a balancing lobe of the opposite polarity, hence it introduces a D.C. component. This D.C. component, if allowed to pass on to the A.C. motor 16, could cause it to momentarily stall or "grab". (It will be appreciated that the motor would normally be free wheeling at this time, since power has only been momentarily removed). By soft starting the power after a power dropout, the D.C. component is essentially eliminated and the motor smoothly re-energized.

Figure 3:
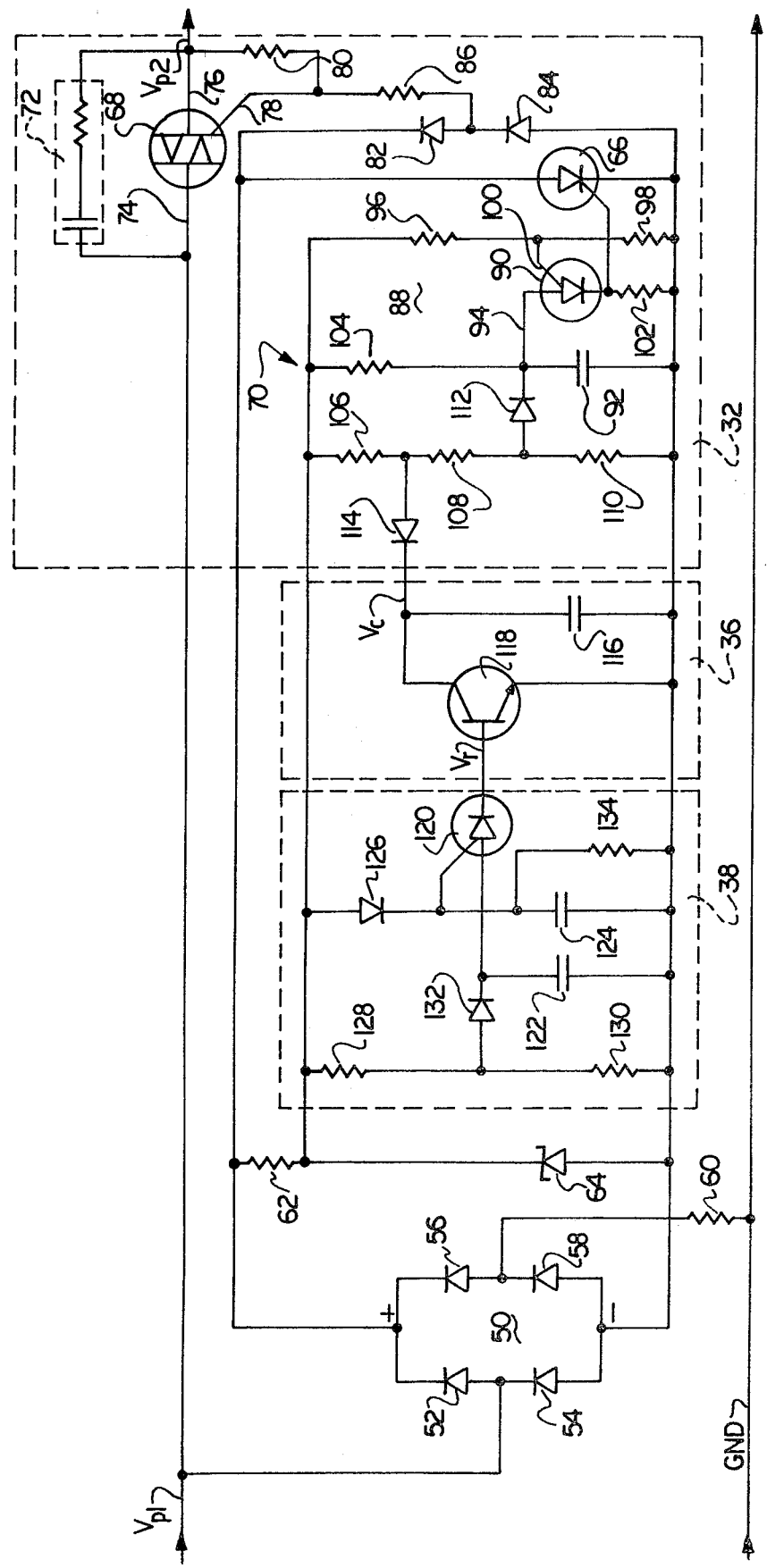

FIG. 3 is a detailed circuit schematic of one embodiment of the circuitry generally represented in FIG. 1. Portions of the FIG. 3 circuitry which correspond with parts of the FIG. 1 circuitry are labelled with corresponding reference numerals. Thus, the FIG. 3 circuitry includes the power supply 32, soft start control circuit 36, and the dropout timer 38 illustrated generally in FIG. 1. In addition, the circuitry of FIG. 3 includes a D.C. power supply circuit for supplying D.C. power to the other portions of the circuitry illustrated in FIG. 3.

In FIG. 3, the D.C. power supply circuit includes a bridge rectifier 50 (i.e., the four diodes 52, 54, 56 and 58), a current limiting resistor 60 whose purpose will become apparent hereinafter, and a zener diode regulator circuit. These four diodes full-wave rectify the A.C. power signal being applied thereto to provide a full-wave rectified power signal across its positive and negative nodes. A zener diode regulator circuit consisting of a series-connected combination of a current limiting resistor 62 and a zener diode 64 is connected across the positive (+) and negative (−) outputs of the bridge rectifier. Since no filter capacitor is provided, the voltage appearing across the zener diode 64 will drop to zero at zero crossings of the full-wave rectified power signal. Stated differently, the waveform appearing across the zener diode 64 (ignoring, for now, the operation of the remainder of the circuitry illustrated in FIG. 3) will essentially represent a truncated version of the full-wave rectified signal provided by the bridge rectifier, where the voltage at which the truncation takes place corresponds to the zener voltage of the zener diode 64. (In actual operation, an SCR 66 associated with the power supply circuit 32 will periodically short across the output of the bridge rectifier, hence the above characterization is not completely accurate.)

The power supply circuit 32 includes a triac solid state switch 68 and a control circuit 70 for triggering the triac at an appropriate time in each half cycle of the A.C. power signal $V_{p1}$. The triac 68 has a conventional "snubber" circuit 72 connected across its two main terminals 74 and 76 so as to prevent erroneous self-triggering of the triac 68 due to a rapidly changing voltage thereacross (known in the art as dv/dt switching). The triac 68 has its gate terminal 78 connected to terminal 76 by a resistor 80 whose purpose is to desensitive the gate of the triac to noise.

Triggering of the triac 68 is controlled by a circuit consisting of the SCR 66 and two diodes 82 and 84 which are connected in series with one another and in parallel with the SCR 66. The parallel-connected combination of the SCR 66 and the diodes 82 and 84 is connected across the output of the full-wave rectifier 50. The gate terminal 78 of the triac 68 is connected to the junction between the two diodes 82 and 84 through a current-limiting resistor 86. The state of triac 68 is dependent upon the state of SCR 66. If the SCR 66 is triggered, then it will conduct, which in turn will trigger triac 68. As long as SCR 66 is in a nonconducting state, however, the triac 68 will also be nonconducting.

More specifically, if the SCR 66 is not conducting, then a full-wave rectified signal will appear across the two diodes 82 and 84. These diodes are poled so as to be reversed biased, and therefore nonconducting, in this circumstance. In this case no current will be provided to the gate electrode 78 of the triac 68, hence it will remain in a high impedance, nonconducting state.

If the SCR 66 is triggered and begins conducting, however, then the output of the full-wave rectifier 50 is essentially shorted. In essence, this directly connects the gate terminal 78 of the triac 68 to the junction between the diodes 52 and 54 of the full-wave rectifier, and hence to the main terminal 74 of the triac. This is true regardless of whether the A.C. power signal $V_{p1}$ is positive or negative at that time.

If the power supply signal $V_{p1}$ is positive, then the conduction route is through diode 52, SCR 66, and diode 84. If the power supply signal $V_{p1}$ is negative, then the conduction path is through diode 54, SCR 66, and diode 82. In either event current will be supplied to the gate terminal 78 and the triac 68 will become conductive, switching to its "on" state. Power will then be supplied to the load circuits 14 through triac 68 for the remainder of that half cycle of the A.C. power cycle. At the conclusion of the half cycle, current through both SCR 66 and triac 68 will drop to zero, causing them to automatically revert to high impedance, blocking states.

The conduction of the SCR 66 also functions to essentially short the junction of diodes 52 and 54 to the junction of diodes 56 and 58. It is for this reason that the current limiting resistor 60 is included. In the absence of this resistor, the conduction of the SCR 66 would effectively short the power signal $V_{p1}$ to ground, causing a destructive level of current to pass through the SCR 66 and the diodes of the bridge rectifier 50.

In view of the foregoing, it is apparent that the state of the triac 68 is directly controlled by the conduction state of the SCR 66. When the SCR 66 is triggered, then the triac 68 will similarly be triggered. As stated previously, after triggering both the SCR 66 and the triac 68 will remain conductive until the current passing through them drops below the holding current necessary to maintain them in conduction. This will occur at the conclusion of each half cycle, when the voltage and hence current drops to a zero level. (Although some inductive loads will cause the current and voltage waveforms to pass through zero at different times, this can be ignored for purposes of the present discussion.) When this occurs both the SCR 66 and the triac 68 will drop out of conduction and will thereafter be prepared for reactuation in the next half cycle.

The state of the SCR 66 is controlled by a circuit 88 whose heart is a programmable unijunction transistor (PUT) 90. This PUT 90 provides a trigger pulse to the SCR 66 at some time in each half cycle of the power signal $V_{p1}$. The time delay between the beginning of each half cycle and the triggering of the SCR 66 by the PUT 90 will depend upon the charging rate of a timing capacitor 92. This capacitor 92 is connected between the anode 94 of the PUT and the negative (−) node of bridge rectifier 50. The PUT 90 acts essentially as a comparator, comparing the voltage appearing across the capacitor 92 with a reference voltage derived by a voltage divider consisting of two resistors 96 and 98 which are connected in series across the zener diode 64. The reference voltage appearing at the junction between the two resistors 96 and 98 is applied to the gate electrode 100 by connecting the gate to that junction.

In each half cycle of the A.C. power signal $V_{p1}$, the capacitor 92 will charge towards the zener voltage, at some point reaching a voltage level which exceeds the reference voltage applied to the gate terminal 100 of the PUT. When this occurs, the PUT 90 will trigger, discharging the capacitor 92 through a cathode resistor 102 which connects the cathode of the PUT 90 to the negative output of the bridge rectifier 50. The resulting voltage pulse appearing across cathode resistor 102 is of sufficient magnitude to trigger the SCR 66, which has its gate electrode connected to a junction between the resistor 102 and the cathode of the PUT 90. Consequently, in each half cycle the PUT 90 will trigger, thereby triggering the SCR 66, which will in turn trigger the triac 68.

The delay between the beginning of each half cycle and the firing of the PUT will vary with the magnitude of the charging current being supplied to the capacitor 92. In the FIG. 3 embodiment this charging current is derived from two sources. The first source is a resistor 104 which is connected between the cathode of the zener diode 64 and the capacitor 92. The second source is a resistance divider consisting of three resistors 106, 108 and 110 connected to the capacitor 92 through a diode 112.

The level of current derived from this second source is dependent upon the magnitude of the control voltage $V_c$ provided by the soft start control circuit 36. If the control voltage is low, then little current will be supplied through the diode 112. Since resistor 104 is relatively large, the capacitor 92 will then charge slowly. A relatively long delay will then occur before the PUT 90 fires. If the control voltage is high, more current will be supplied through diode 112, capacitor 92 will charge more rapidly, and the PUT 90 will fire earlier.

In the embodiment illustrated in FIG. 3 the three resistors 106, 108 and 110 are connected in series with one another across the zener diode 64, with the resistors 106 and 110 being respectively coupled to the cathode and anode of the zener diode 64. The diode 112 is connected from the junction between resistors 108 and 110 to the capacitor 92, with a second diode 114 being coupled from the junction between resistors 106 and 108 to the soft start control circuit 36. The magnitude of the charging current supplied to the capacitor 92 through the diode 112 will depend upon the voltage applied to the cathode of the diode 114 by the soft start control circuit 36. If this voltage is quite low, then the voltage appearing at the junction between resistors 108 and 110 will similarly be very low, the diode 112 will be reversed biased, and essentially no charging current will be supplied to capacitor 92 via this route. In the event that the voltage applied to the cathode of the diode 114 is substantially higher, however, then charging current will be supplied to the capacitor 92 through the resistors 106 and 108. If the voltage applied to the cathode 114 is at an intermediate level, then an intermediate amount of charging current will be provided to the capacitor 92 thereby.

In FIG. 3, the soft start circut 36 simply consists of a capacitor 116 with a transistor 118 connected with its collector emmiter current path in parallel therewith. The capacitor 116 is connected between the cathode of diode 114 and the negative output of the bridge rectifier 50, so that a charging current is provided thereto through the resistor 106 and the diode 114.

Upon the initial application of power to the circuitry of FIG. 3, the capacitor 116 is fully discharged. Thereafter, the capacitor 116 slowly (over a period of perhaps 10 or 15 cycles of the A.C. power signal) charges toward the zener voltage. The diode 114 prevents the soft start capacitor 116 from discharging during zero crossings of the A.C. power cycle and during conduction of the SCR 66. As the capacitor 116 charges, the phase delay between the beginning of each half cycle of the A.C. power signal and the triggering of the triac 68 will diminish, causing greater and greater amounts of power to be applied to the load. Eventually the capacitor 116 will be fully charged; the capacitor 92 will then charge very rapidly in each half cycle, causing the SCR 66, the triac 68 to be triggered very early in each half cycle.

In the event of a power interruption, it is desirable to reset the soft start feature as rapidly as possible. It is for this purpose that the transistor 118 is provided. When a sharp pulse is provided to the base of transistor 118, the transistor 118 will heavily conduct, causing the capacitor 116 to be discharged very rapidly and the soft start feature to be reset. The reset signal $V_r$ applied to the base of transistors 118 is derived from the power dropout timer 38.

In the FIG. 3 embodiment, the power dropout timer 38 includes another programmable unijunction transistor (PUT) 120. This PUT 120 compares the voltage across a timing capacitor 122 with a reference voltage applied to the gate input to the PUT 120. The reference voltage is derived from another capacitor 124 which is connected in series with a diode 126 across the zener diode 64. The capacitor 122, on the other hand, is connected to the anode of PUT 120 and also to a voltage divider consisting of two resistors 128 and 130, which are connected in series across the zener diode 64. The junction between the two resistors 128 and 130 is connected to the capacitor 122 through a second diode 132.

When power is initially applied to the circuit of FIG. 3, the capacitor 124 will very rapidly charge up to the zener diode voltage through the diode 126. The capacitor 122, however, will charge more slowly to the lower voltage established by the voltage divider consisting of the resistors 128 and 130. Since this voltage is lower than the voltage applied to the gate of the PUT by the capacitor 124, the PUT 120 will not trigger.

In the event that there is a power dropout, both of the diodes 132 and 126 will become reversed biased, preventing the respective capacitors 122 and 124 from discharging through the paths by which they were charged. Capacitor 122 will maintain its charge, since no other discharge path exists. The capacitor 124 which is providing the reference voltage to PUT 120, however, will discharge through a bleed resistor 134, eventually discharging to the point that the reference voltage is below the PUT anode voltage. The PUT will fire at that time. The resistor 134 is selected so that this will occur within a very short number of half cycles (perhaps one or even less than one) after the dropout of power. When the PUT 120 fires, the capacitor 122 is discharged through the base-emitter junction of the transistor 118, which in turn discharges the soft start capacitor 116.

Thus, during normal zero crossings of the A.C. power signal no resetting of the soft start capacitor 116 will take place since the timer 38 will no have adequate time to time out. In the event of a power dropout, however, the soft start capacitor 116 will be completely reset in a very brief interval thereafter, causing the circuit to soft start upon the return of power to the circuit.

This circuit therefore prevents the large current inrush which might otherwise take place following even very brief power outages, while also blocking incidental D.C. components in the power signal from A.C. load devices.

Although the invention has been described with respect to a preferred embodiment, it will be appreciated that various rearrangements and alterations of parts may be made without departing from the spirit and scope of the present invention, as defined by the appended claims.

What is claimed is:

1. Apparatus for transmitting power from a power source to a load, comprising:
   first means for controlling the level of power transmitted to said load from said power source, including means for soft starting the transmission of power to said load, upon initial turn-on of said power source, by initially transmitting power at a low level and thereafter gradually increasing the level of transmitted power to a higher level said soft starting means being responsive to a reset signal to completely reset the soft start function; and
   second means for providing said reset signal to said soft starting means only if the power provided by said power source drops out for in excess of a predetermined interval of time whereby when power thereafter returns the transmission of power to said load is again soft started at said low level.

2. Apparatus as set forth in claim 1, wherein said first means comprises power supply means for varying the level of power transmitted to said load in accordance with a control signal, said means being responsive to a control signal having a first value to transmit power at said low level, to a control signal having a second value to transmit power at said higher level, and to a control signal having a value intermediate said first and second values to transmit power at a level correspondingly intermediate said low and higher levels, and soft starting means for providing a control signal to said power supply means, said soft starting means providing a control signal having said first value upon the initial turn-on of said power source and thereafter gradually varying said control signal value towards said second value, said soft starting means being responsive to said reset signal for resetting said control signal to said first value.

3. Apparatus as set forth in claim 1, wherein said power source provides an A.C. power signal and wherein said second means comprises means for providing said reset signal to said soft starting means only if said A.C. power signal provided by power source drops out for in excess of a predetermined interval of time, where said time interval is selected to be great enough that said resetting means does not reset said soft starting means during zero crossings of said A.C. power signal.

4. Apparatus as set forth in claim 3, wherein said soft starting means responds to said resetting means to reset said soft start within a fraction of one half of an A.C. power signal cycle.

5. Apparatus as set forth in claim 1, wherein said soft starting means includes means responsive to said second means for resetting said soft start within a time interval which is a fraction of the length of said predetermined interval of time.

6. Apparatus as set forth in claim 1, wherein said second means comprises means for monitoring the power provided by said power source and for providing a reset pulse if said power drops out for in excess of said predetermined period of time, and wherein said soft starting means includes means responsive to said reset pulse for resetting said soft start within a time interval which is a fraction of the length of said predetermined interval of time.

7. Apparatus for controlling the application of an A.C. power signal to a load in such a manner as to prevent excessive current inrush, comprising:
   A.C. phase control power supply means responsive to a control signal for varying the phase angle at which said A.C. power signal is applied to said load, said power supply means responding to a control signal having a first value to apply power at a phase angle wherein said A.C. power is applied to said load at a first level and to a control signal having a second value to apply power at a phase angle wherein A.C. power is applied to said load at a second level greater than said first level;
   means for providing said control signal to said power supply means, said means providing said control signal having said first value upon the initial application of power to said apparatus, and thereafter gradually varying said control signal value towards said second value, said means being responsive to said reset signal for resetting said control signal to said first value within a fraction of a cycle of said A.C. power signal; and
   reset means responsive to the withdrawal of said A.C. power signal from said apparatus for providing said reset signal to said control signal providing means only upon the withdrawal of power for in excess of a first predetermined period of time,
   whereby power withdrawals which are shorter than said predetermined period of time do not reset said control signal providing means but power withdrawals in excess of said predetermined period of time cause said control signal providing means to reset said control signal within a fraction of a cycle of said A.C. power signal.

8. Apparatus as set forth in claim 7, wherein said first predetermined period of time is selected to be great enough that said control signal is not reset during zero crossings of said A.C. power signal.

* * * * *